Patented Sept. 6, 1927.

1,641,573

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR TREATING LATEX AND PRODUCTS OBTAINED THEREBY.

No Drawing.     Application filed September 22, 1925. Serial No. 57,960.

The application of rubber latex in the manufacture of rubber goods and in other industries has been largely confined to the use of unvulcanized latex, and the penetrating properties and adhesive properties of the latter have been employed to great advantage. Recently processes have been suggested for vulcanizing the rubber in latex without causing any substantial amount of coagulation. There are, however, certain instances where it may be desirable to vulcanize the rubber after it has been deposited on a surface or has been allowed to impregnate a material. This may be accomplished by combining with the latex the necessary vulcanizing ingredients. Vulcanization may then be accomplished after the aqueous portion of the latex has been removed, heat being generally applied to accomplish this removal.

It is not, however, always desirable to employ heat in order to vulcanize rubber laid down from an unvulcanized latex. The present invention provides a means of vulcanizing the rubber derived from unvulcanized latex without the application of heat. The invention also provides a method whereby high powered accelerators may be mixed with rubber latex and their vulcanizing action controlled or suspended at will.

The principal object of the invention accordingly is to provide a method of treating rubber latex so that the rubber contained therein will vulcanize at ordinary temperatures after the aqueous portion of the latex has been removed. Another object of the invention is to provide a method whereby vulcanization of the rubber may be retarded while the rubber is in the form of latex. Another object of the invention is to retard the vulcanizing action of accelerators while these accelerators are present in rubber latex. The invention also provides a method for permitting the vulcanization of rubber derived from unvulcanized latex to take place at ordinary temperatures.

With a preferred embodiment in mind but without desiring to limit the scope of the invention beyond what may be required by the prior art, the invention consists in treating a vulcanizable latex with a material adapted to inactivate at least one of the curing ingredients contained therein so that the latex itself will not vulcanize appreciably at ordinary temperatures. The invention also includes a means for inactivating the accelerating ingredient contained in a vulcanizable latex until the aqueous portion of the latex has been removed, whereupon vulcanization of the rubber derived from the latex may take place at ordinary temperatures.

As an illustration of the invention the following example may be used:—

100 parts by weight of rubber in the form of ammonia-preserved latex containing 20% or more of rubber, 2 parts by weight of zinc oxide,
    3 parts by weight of sulphur
    1 part by weight of zinc dithiobenzoate.

This mixture will not vulcanize appreciably at ordinary temperatures while it remains in the form of latex. The ammonia used as a preservative, together with other ingredients of the latex, reacts with the dithiobenzoate to decompose it sufficiently to weaken its accelerating properties. That decomposition takes place appears to be substantiated by the fading of the orange color which the dithiobenzoate imparts to the latex. By allowing the water in the above latex composition to evaporate at ordinary temperatures shortly after the addition of the dithiobenzoate, it may be observed that the rubber derived from the latex will vulcanize in 24 to 48 hours at ordinary temperatures. This retarding action is believed to be due to the ammonia which, while it is in the latex decomposes the dithiobenzoate, but when it evaporates from the latex along with the water, it leaves the dithiobenzoate in a condition to cause vulcanization to proceed at ordinary temperatures.

Vulcanization of rubber in the form of latex may be accomplished at ordinary temperatures by the use of non-nitrogenous carbon disulphide derivatives such as salts of thiol acids, disulphides, ammonia sulphides, xanthogenates, etc. Vulcanization in the latex, where the above accelerators have been used, may be retarded by the addition of an excess of basic material such as ammonia, sodium hydroxide, trisodium phosphate, strongly basic amines such as piperidine, dimethyl amine, trimethyl amine, triethyl amine, and any volatile primary aliphatic amines.

The invention may also be carried out with a zinc salt which contains nitrogen in a form in which it may be liberated from the salt as ammonia. 100 parts of rubber in the form of ammonia-preserved latex containing say 20% of rubber is mixed with 3 parts of sulphur. This latex is not easily vulvanizable in the form of latex at ordinary temperatures. Shortly before the water and ammonia are allowed to evaporate the latex-sulphur mixture may be treated with a solution of 1.7 parts by weight of zinc chloride dissolved in 15 parts by weight of water and 6½ parts by weight of concentrated ammonia. An aqueous solution of 1 part by weight of sodium dithiobenzoate is then added to the latex mixture. This latex composition will not vulcanize appreciably at ordinary temperatures, but the rubber obtained therefrom after evaporation of the water (and accompanying removal of the ammonia) will vulcanize at ordinary temperatures in 24 to 48 hours.

The longer the complete mixture, that is the mixture containing the ammonia or other basic material as mentioned above, is allowed to stand before removal of the water, the slower and less complete will be the vulcanization of the rubber derived from the latex.

Instead of sodium dithiobenzoate or zinc dithiobenzoate, the butyl xanthogenates of these metals may be employed with equal facility, although these xanthogenates may cause some difficulty through coagulation where latices more concentrated than 20% are employed. In the above examples latex containing as much as 33% of dry rubber may be employed.

It will be seen that this invention offers many advantages where it is desirable or necessary to employ an unvulcanized latex, and particularly where it is desirable to vulcanize the rubber obtained from an unvulcanized latex at ordinary temperatures, without having to resort to the use of vulcanized latex composition.

Having thus described my invention, what I claim and desire to protect by Letters Patent is:

1. A method for treating rubber latex which consists in retarding the vulcanization of the rubber in said latex by inactivating at least one of the vulcanizing ingredients contained therein.

2. A method for retarding the vulcanization of rubber in the form of latex which consists in treating a vulcanizable latex with an excess of a basic material.

3. A method for retarding the vulcanization of rubber in the form of latex which consists in treating a vulcanizable latex with an excess of a basic nitrogenous material.

4. A method of retarding the vulcanization of rubber in the form of latex which consists in treating a vulcanizable latex containing a non-nitrogenous carbon disulphide derivative with an excess of a basic material.

5. A method for retarding the vulcanization of rubber in the form of latex which consists in treating a vulcanizable latex containing a non-nitrogenous carbon disulphide derivative with an excess of a basic nitrogenous material.

6. A method for retarding the vulcanization of rubber in the form of latex which consists in treating a vulcanizable latex containing a salt of a thiol acid with an excess of a basic nitrogenous material.

7. A method for retarding the vulcanization of rubber in the form of latex which consists in treating a vulcanizable latex containing a salt of a thiol acid with an aliphatic amine in excess of the vulcanization requirements.

8. A method for retarding the vulcanization of rubber in the form of latex which consists in treating a vulcanizable latex containing a salt of a thiol acid with a primary aliphatic amine in excess of the amount required for vulcanization.

9. A method for retarding the vulcanization of rubber in the form of latex which consists in treating a vulcanizable latex containing a salt of a thiol acid with ammonia.

10. A method for vulcanizing at ordinary temperatures the rubber derived from an unvulcanizable latex which consists in incorporating with rubber latex an accelerating combination adapted to vulcanize the latex, retarding the vulcanizing function of the combination while in said latex, removing water from the latex and recovering a rubber which vulcanizes at ordinary temperatures.

11. A method for vulcanizing at ordinary temperatures the rubber derived from an unvulcanizable latex which consists in treating a latex vulcanizable at ordinary temperatures with a basic material, removing the aqueous portion of said latex and recovering a rubber vulcanizable at ordinary temperatures.

12. A method for vulcanizing at ordinary temperatures the rubber derived from an unvulcanizable latex which consists in treating a latex vulcanizable at ordinary temperatures with a basic nitrogenous material, removing the aqueous portion of said latex and recovering a rubber vulcanizable at ordinary temperatures.

13. A method for vulcanizing at ordinary temperatures the rubber derived from an unvulcanizable latex which consists in treating a vulcanizable latex containing a non-nitrogenous carbon disulphide derivative with a strongly basic material to inactivate said carbon disulphide derivative while in said latex, removing the aqueous portion of the latex and recovering a rubber containing said carbon disulphide derivative in a condition adapted to cause the rubber to vulcanize at ordinary temperatures.

14. A method for vulcanizing at ordinary temperatures the rubber derived from an unvulcanizable latex which consists in treating a vulcanizable latex containing a salt of a thiol acid with a strongly basic material to inactivate said salt while in said latex, removing the aqueous portion of the latex and recovering a rubber containing said salt in a condition adapted to cause the rubber to vulcanize at ordinary temperatures.

15. A method for vulcanizing at ordinary temperatures the rubber derived from an unvulcanizable latex which consists in treating a vulcanizable latex containing a salt of a thiol acid with a strongly basic nitrogenous material to inactivate said salt while in said latex, removing the aqueous portion of the latex and recovering a rubber containing said salt in a condition adapted to cause the rubber to vulcanize at ordinary temperatures.

16. A method for vulcanizing at ordinary temperatures the rubber derived from an unvulcanizable latex which consists in treating a vulcanizable latex containing a salt of a thiol acid with an aliphatic amine to inactivate said salt while in said latex, removing the aqueous portion of the latex and recovering a rubber containing said salt in a condition adapted to cause the rubber to vulcanize at ordinary temperature.

17. A method for vulcanizing at ordinary temperatures the rubber derived from an unvulcanizable latex which consists in treating a vulcanizable latex containing a thiol salt with ammonia to inactivate said thiol salt while in said latex, removing the aqueous portion of the latex and recovering a rubber containing said thiol salt in a condition adapted to cause the rubber to vulcanize at ordinary temperature.

18. A method for vulcanizing at ordinary temperatures the rubber derived from an unvulcanizable latex which consists in treating a vulcanizable latex containing a zinc dithiobenzoate with ammonia to inactivate said zinc dithiobenzoate while in said latex, removing the aqueous portion of the latex and recovering a rubber containing said zinc dithiobenzoate in a condition adapted to cause the rubber to vulcanize at ordinary temperature.

Signed at New York, county and State of New York, this 9th day of September, 1925.

SIDNEY M. CADWELL.